US005544850A

United States Patent [19]

Fankhauser

[11] Patent Number: 5,544,850

[45] Date of Patent: Aug. 13, 1996

[54] BANNER HOLDING DEVICE

[76] Inventor: Alan Fankhauser, 5 Konan Ct., Ashmore, Queensland 4214, Australia

[21] Appl. No.: 333,773

[22] Filed: Nov. 3, 1994

[30] Foreign Application Priority Data

Nov. 3, 1993 [AU] Australia ................................ PM2159

[51] Int. Cl.[6] .................................................... F16M 11/20

[52] U.S. Cl. ............................ 248/164; 40/606; 248/166

[58] Field of Search .................................... 248/158, 166, 248/164, 168, 169, 165, 431; 40/606, 610, 587

[56] References Cited

U.S. PATENT DOCUMENTS 3,559,322 2/1971 Nickel ....................................... 40/587
4,763,865 8/1988 Danner .................................... 248/164
5,033,737 7/1991 Moye ................................. 248/164 X
5,078,352 1/1992 Brow ....................................... 248/166
5,079,861 1/1992 Stoudt ................................ 248/166 X
5,145,133 9/1992 France .................................... 248/168
5,371,964 12/1994 Kubacki ..................................... 40/610

*Primary Examiner*—J. Franklin Foss
*Attorney, Agent, or Firm*—Davis, Bujold & Streck, P.A.

[57] ABSTRACT

A device (in part 10) for holding a banner in position over a motor vehicle which comprises:

1. at least two upright means (11).
2. separate prop means (12) attached to the lower portion of each upright means (19, 191); and
3. foot means (13, 14) connected to the bottom of each of the upright means and each of the prop means, wherein each foot means may be positioned to one side of a corresponding tire of the motor vehicle, an upright means and a corresponding prop means extending generally upwards across the outside of the tire, whereby a banner may be connected to one upright means and extend above the vehicle to a corresponding second upright means.

8 Claims, 1 Drawing Sheet

BANNER HOLDING DEVICE

FIELD OF THE INVENTION

This invention relates to devices used to hold banners by means of a pair of upright means (or standards). It is particularly applicable to portable devices which utilise a pair of upright means which are held in place by wheels of an automobile and between which a banner is secured. It will however be understood that the invention is applicable to portable devices which hold display boards, flags or the like.

BACKGROUND OF THE INVENTION

There are in existence many forms of signage, including: billboards, placards, posters, display boards, signs attached to or painted on buildings or walls, lighted signs, electronic signs, moving signs and so on. The commercial use of these signs for advertising and information transfer is well known.

There are also types of signs which are more portable, including, A-boards (sandwich boards), picket signs, flags and banners. These are particularly useful to advertise wares or services which are short-term in nature, for instance, house auctions, car sales, end-of-season sales, and the road-side sales of goods. It may be preferred by some to provide signage which is portable or removable for reasons of preventing vandalism, to avoid permanent fixture of signs which may infringe on Council by-laws and to provide flexible signage.

However there are disadvantages with current methods of portable or fixed signage. In the real estate business especially, there are many instances where prominent temporary signage is desirable but current methods could be improved on. A house may be open to public for inspection for a limited period or an auction may be about to commence. Whilst the abovementioned portable sign systems are used, these may not always be as prominent as is desired. Flags and banners held by poles or stakes tend to flap and become unstable in wind. People may stand in front of an A-board or other signs mounted at a lower level.

In other applications there may be little room to employ a reasonably large sign of the usual type. Fast food stores may try to attract passing trade and wish to display signage to road traffic. In order to achieve this aim, they may use solid signs attached to the roof of a parked car by way of a roof rack fixture. Such signs are however often difficult to erect or may collapse. In addition signs may be unsightly and bulky when not in use.

In order to overcome these problems, it is proposed to provide a device for holding a banner in position over a motor vehicle. The device comprises two upright means which may be collapsible and which are held in place by the motor vehicle tires and between which a banner is held.

The advantages of this system are many. Thus, where the upright means (poles or supports) are collapsible, the invention is very compact and portable. The banner rolls or folds up, and the standards are disassembled or hinged into compact form. The device may be easily carried in a car, or stored when not in use.

The device is easy to erect and collapse, is held firm and stable in wind and is out of the way so people will not trip over it. The banner is held high and near the road for good visibility and impact. It is unlikely to be obscured by parked cars or people standing nearby. A variety of banners can be easily put into position, so the message may be altered quickly.

BRIEF SUMMARY OF THE INVENTION

This invention provides a device for holding a banner in position over a motor vehicle which comprises:

1. at least two upright means;
2. separate prop means attached to the lower portion of each upright means; and
3. foot means connected to the bottom of each of the upright means and each of the prop means, wherein each foot means may be positioned to one side of a corresponding tire of the motor vehicle, an upright means and a corresponding prop means extending generally upwards across the outside of that tire, whereby a banner may be connected to one upright means and erected above the vehicle to a corresponding second upright means.

BRIEF DESCRIPTION OF THE DRAWINGS

The accompanying drawings illustrates one embodiment of the invention in which.

DETAILED DESCRIPTION OF THE INVENTION

Figure 1:
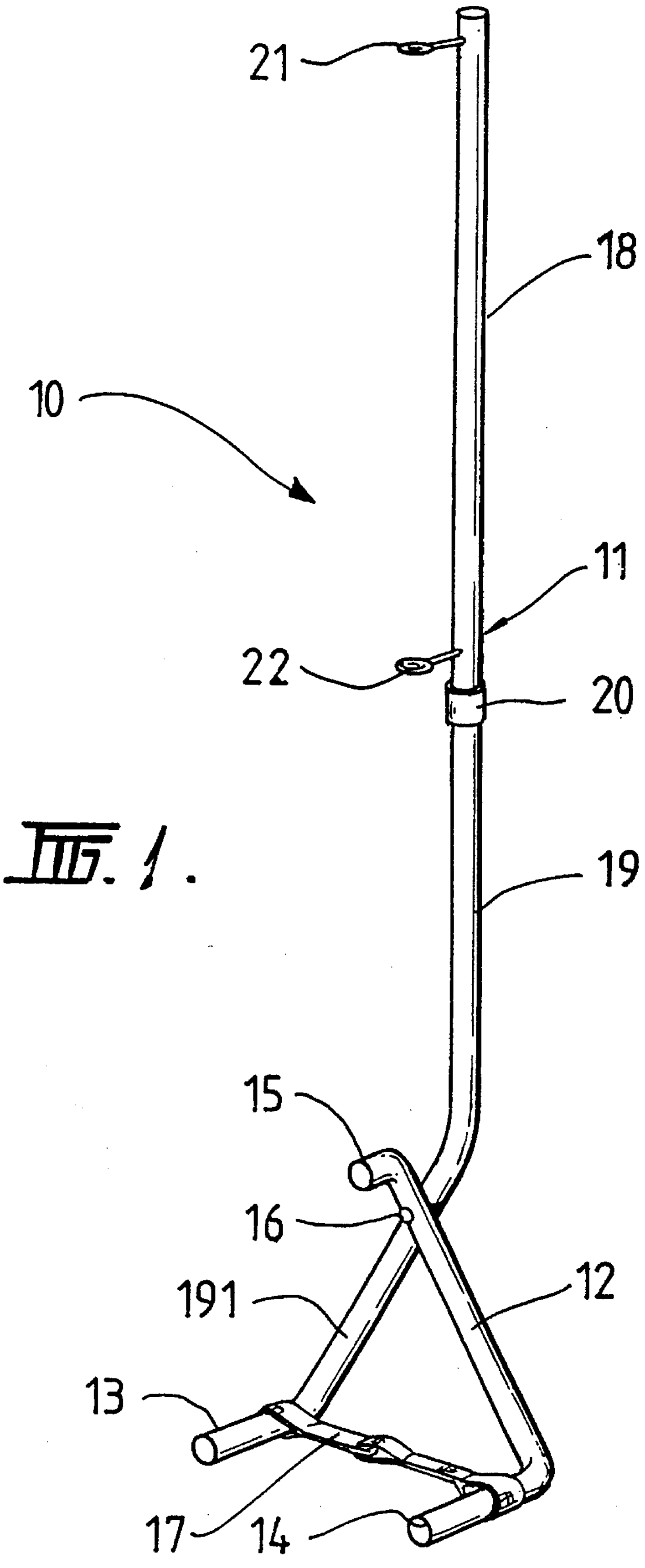
FIG. 1 is an isometric view from the front and to one side of the assembled device according to the invention.

Each upright means is preferably constructed to have a lower portion and a upper portion connected together by, for example, a screw-thread means. The lower portion is preferably bent so that in use it may reach diagonally across a wheel and terminate in a lowermost portion bent approximately at right angles in a plane extending toward the wheel, as inturned in use. The lowermost portion forms a foot means.

A prop means is preferably pivotally attached to the lower portion. At the upper end of the prop means, as viewed in use, is a first inturned portion, the relevant bend being approximately right angled. This inturned portion is adapted to fit against the outside side of the tire. At the lower end of the prop means, as viewed in use, is a second inturned portion, the relevant bend again being approximately right angled. This inturned portion forms another foot means.

In other embodiments of the invention, the prop means may have a fixed rather than a pivoting prop means. Alternatively the prop means may be pivotally attached and sprung, to prevent it from swinging shut, or may be outwardly sprung, to press against the tire firmly. It may also be selectively adjustable for length in a known manner.

The length of the prop means may be selected to suit the particular tires and/or wheels used.

The lower part of each upright means and its associated prop means clamp the tire in a scissor-type action. To allow the upright means and the prop means to be easily fitted and dismantled and to provide tension between the two parts, there is also provided a strap arrangement and toggle buckle (or ratchet buckle or the like) apparatus. A strap is attached to each foot means. The buckle is attached to one strap, with the free end of the other strap extending through it. In this way the system can be tensioned as desired.

It can be seen that the preferred embodiment provides a simple method for manufacture of the device. The strap and buckle system securely holds each of the two upright means, for example, with respect to the front wheels of a car. A banner strung between the upright means is displayed prominently and also tensions the device laterally. Vertical height adjustment of the upright means allows different sized banners to be fitted, or the invention to be used on different car models.

Each upright means and prop means is preferably constructed from tubular portions. In a preferred form of the invention major portions of the device are fabricated from tubular galvanized steel or aluminium. All ends of the tubular portions may be capped with plastic caps to protect them and to avoid damage to tires.

The banner may be of vinyl, cloth, canvas or other flexible material. It may be of rectangular shape, with an eyelet in each corner. Attached to each eyelet, are four pieces of rope, cord, or elastic material, of suitable length for tieing to the four corresponding loops provided on the upper part of the standards. Other means of attachment include providing stiffeners at the corners of the banner and attaching hooks to the stiffeners. The rope or other material may be knotted or have clips or hooks provided in a known manner.

Alternative embodiments of the invention are possible without affecting the inventive concept. A clamp arrangement may, for instance, be provided on a middle portion of the upright means, rather than the upper portion. Alternative clamping systems may be used, including a simple pin and hole device. The upper portion may be of smaller or larger diameter than the lower portion.

The system of banner attachment may also differ in the upright means. Holes through the tube at intervals may be employed instead of loops. Eyelets may be employed.

In another embodiment, each support means is a single portion, rather than a slot-together arrangement.

In another embodiment, the various portions of the support means are tubular and are all of the same diameter and are swaged in the fashion of tent poles to allow interlocking. A height adjustable clamping arrangement may or may not be present.

Turning to the accompanying drawing, numeral 10 in FIG. 1 indicates a part of the device according to the invention. An upright means 11 is pivotally connected in its lower region to a prop means 12. Upright means 11 terminates in foot means 13 and prop means 12 in foot means 14. Prop means 12 terminates at its other end in a turned over positioning means 15. A pivot point 16 is shown near positioning means 15, indicating where prop means 12 is pivotally joined to upright means 11.

A belt and buckle arrangement 17 is shown as joining foot means 13 and 14 respectively.

Upright 11 comprises straight upper portion 18 and lower, kinked portion 19. The lowermost leg portion 191 comprises the pivot point 16.

A clamp 20 joins upper portion 18 and lower portion 19. Two spaced apart winged hooks 21 and 22 are connected spaced apart to upper portion 18 for attachment of the cord holding the banner (not shown).

The claims defining the invention are as follows; I claim:

1. A device for holding a banner in position over a motor vehicle which comprises:

1. at least two upright means;
2. separate prop means attached to the lower portion of each upright means;
3. foot means connected to the bottom of each of the upright means and to the bottom of each of the prop means, and extending substantially at right angles to the upright means and the prop means;
4. positioning means connected to an upper end of the prop means, extending substantially at right angles thereto; and
5. adjusting means connected to the prop means such that each foot means may be positioned to one side of a corresponding tire of the motor vehicle, wherein the upright means and corresponding prop means extend generally upwards across the outside of that tire, whereby a banner may be connected to one upright means and extend above the vehicle to a corresponding second upright means.

2. A device according to claim 1, wherein two upright means are used.

3. A device according to claim 1, wherein the upright means comprises two or more portions joinable together.

4. A device according to claim 3, wherein the lower or lowermost portion is kinked to form a leg.

5. A device according to claim 1 wherein the prop means is pivotally attached.

6. A device according to claim 1, wherein the prop means is fixedly attached.

7. A device according to claim 1, wherein the prop means is pivotally attached and provided with spring means.

8. A device according to claim 1, wherein the prop means is selectively adjustable for length in a known manner.

* * * * *